United States Patent
Wallace et al.

(10) Patent No.: US 7,890,531 B2
(45) Date of Patent: Feb. 15, 2011

(54) METHOD FOR RESOLVING PERMISSION FOR ROLE ACTIVATION OPERATORS

(75) Inventors: Adam Jay Wallace, Mentor, OH (US); Dennis A. Burns, Lakewood, OH (US); Dennis M. Chin, Stow, OH (US); David S. Keyes, Copley, OH (US); Jeffrey P. Norris, Chicago, IL (US); Philip Daniel Reed, Jr., Cleveland, OH (US)

(73) Assignee: Oracle International Corporation, Redwood Shores, CA (US)

( * ) Notice: Subject to any disclaimer, the term of this patent is extended or adjusted under 35 U.S.C. 154(b) by 418 days.

(21) Appl. No.: 12/110,136

(22) Filed: Apr. 25, 2008

(65) Prior Publication Data

US 2009/0006412 A1 Jan. 1, 2009

Related U.S. Application Data

(60) Provisional application No. 60/947,379, filed on Jun. 29, 2007.

(51) Int. Cl.
  *G06F 17/30* (2006.01)
(52) U.S. Cl. .................................... 707/786
(58) Field of Classification Search ................ 707/784, 707/785, 786, 802
  See application file for complete search history.

(56) References Cited

U.S. PATENT DOCUMENTS

| | | |
|---|---|---|
| 6,023,765 A | 2/2000 | Kuhn |
| 6,088,679 A | 7/2000 | Barkley |
| 6,978,379 B1 | 12/2005 | Goh |
| 7,124,192 B2 * | 10/2006 | High et al. ................. 709/229 |
| 7,415,498 B2 * | 8/2008 | Russo et al. ................ 709/204 |
| 7,461,395 B2 * | 12/2008 | Ng ................................. 726/1 |
| 7,702,758 B2 * | 4/2010 | Shrivastava et al. ......... 709/220 |
| 2002/0026592 A1 * | 2/2002 | Gavrila et al. ............... 713/201 |
| 2004/0225893 A1 | 11/2004 | Ng |
| 2006/0047657 A1 * | 3/2006 | Frieder et al. ................. 707/9 |
| 2007/0214497 A1 * | 9/2007 | Montgomery et al. .......... 726/4 |
| 2008/0022370 A1 * | 1/2008 | Beedubail et al. .............. 726/4 |
| 2008/0034438 A1 * | 2/2008 | Mireku ........................ 726/27 |

FOREIGN PATENT DOCUMENTS

JP 2007-041881 2/2007

OTHER PUBLICATIONS

International Search Report and Written Opinion for PCT/US08/068666, dated Dec. 30, 2008, 7 pages.

* cited by examiner

*Primary Examiner*—Cheryl Lewis
(74) *Attorney, Agent, or Firm*—Fliesler Meyer LLP

(57) ABSTRACT

A method for resolving permissions using role activation operators to evaluate permissions assigned to a user in a role context inheritance hierarchy. The method comprises several steps. A step of retrieving a plurality of activated roles within a role context that match roles assigned to a user, wherein one or more permissions in the role context inherit from one or more permissions in a parent role context in a role context permission inheritance hierarchy. A step of determining an aggregate permission for each of the plurality of activated roles, wherein a role activation operator determines how an activated role is evaluated. A step of processing the aggregate permissions for the plurality of activated roles. A step of resolving a final permission for the user.

26 Claims, 8 Drawing Sheets

| Roles 400 | View 402 | Edit 404 |
|---|---|---|
| Default User 406 | Grant 408 | Inherit 410 |
| Registrar 412 | Grant 414 | Grant 416 |

Permission Classes / Role

FIG. 4

| Java Components Role Context 500 | Role Activation Operator 502 | Read 506 | Write 510 | Delete 514 | Extract 518 |
|---|---|---|---|---|---|
| Developer 520 | EQ 522 | Grant 504 | Grant 508 | Inherit 512 | Grant 516 |
| Guest 524 | EQ 526 | Grant 528 | Deny 530 | Deny 532 | Deny 534 |

Permission Classes (column group header)

Role (row group label)

FIG. 5

| Java Components 710 | Role Activation Operator 712 | Browse 716 | Extract 720 | Delete 724 |
|---|---|---|---|---|
| Foreign National 706 | EQ 714 | Deny 718 | Override Deny 722 | Override Deny 726 |
| Developer 708 | EQ 730 | Grant 734 | Grant 738 | Grant 742 |
| Result 728 | | Granted 732 | Denied 736 | Denied 740 |

Permission Classes

Role

FIG. 7

| Java Components Context 800 | Role Activation Operator 802 | Browse 804 | Create 806 | Delete 808 | Extract 810 |
|---|---|---|---|---|---|
| Developer 812 | GEQ 814 | Grant 816 | Deny 818 | Deny 820 | Grant 822 |

Permission Classes

Role

FIG. 8

METHOD FOR RESOLVING PERMISSION FOR ROLE ACTIVATION OPERATORS

CLAIM OF PRIORITY

The present application claims the benefit of priority under 35 U.S.C. §119(e) to U.S. Provisional Patent Application No. 60/947,379 entitled "RESOLVING PERMISSION METHOD FOR ROLE ACTIVATION OPERATORS" by Adam Jay Wallace, et al., filed on Jun. 29, 2007, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATION

The present application is related to the following United States Patent Application, which application is assigned to the owner of the present invention, and which application is incorporated by reference herein in its entirety:

United States patent application Ser. No. 12/110,133 entitled "COMPUTER READABLE MEDIUM FOR RESOLVING PERMISSION FOR ROLE ACTIVATION OPERATORS," by Adam J. Wallace, et al., filed on Apr. 25, 2008; currently pending.

FIELD OF THE INVENTION

Embodiments of the present invention are in the field of computer security, and relate to role based access control inheritance for a metadata repository.

BACKGROUND OF THE INVENTION

One of the challenging problems in managing large networks is the complexity of security administration. Role Based Access Control (RBAC) reduces the complexity and cost of security administration in large networked applications. Security systems based on RBAC have been adopted in complex software systems from databases to application servers.

Service-Oriented Architecture (SOA) is based on the deconstruction of yesterday's monolithic applications and information technology infrastructure into a matrix of discrete, standards-based, network-accessible services. The process of transformation requires the organization, identification, and repurposing of applications and business processes of the existing information technology infrastructure. The transformation to SOA begins with an analysis of the IT infrastructure to identify applications, business processes, and other software assets that become services, or otherwise support the SOA.

Metadata is data about data, or more specifically, information about the content of the data; service metadata is information about the services in an SOA. Service producers use service metadata to describe what service consumers need to know to interact with the service producers. Service metadata is stored in a metadata repository by service producers and then accessed by service consumers. A metadata repository provides visibility into the portfolio of assets, the traceability of the assets within that portfolio, and the relationships and interdependencies that connect the assets to each other. Furthermore, the metadata repository provides visibility into the policies that govern use of the assets and the projects that produce the assets and consume the assets.

SUMMARY OF THE INVENTION

A method for resolving permissions using role activation operators to evaluate permissions assigned to a user in a role context inheritance hierarchy. The method comprises several steps. A step of retrieving a plurality of activated roles within a role context that match roles assigned to a user, wherein one or more permissions in the role context inherit from one or more permissions in a parent role context in a role context permission inheritance hierarchy. A step of determining an aggregate permission for each of the plurality of activated roles, wherein a role activation operator determines how an activated role is evaluated. A step of processing the aggregate permissions for the plurality of activated roles. A step of resolving a final permission for the user.

BRIEF DESCRIPTION OF THE DRAWINGS

Preferred embodiments of the present invention will be described in detail based on the following figures, wherein:

FIG. 4 is a table that shows an example of a role context diagram in accordance with an embodiment;

FIG. 5 is a table that shows an example of a role context in accordance with an embodiment;

FIG. 7 is a table that shows an example of least restrictive access in accordance with an embodiment; and FIG. 8 is a table that shows an example of a role context with an activated role in accordance with an embodiment.

DETAILED DESCRIPTION OF THE INVENTION

Figure 1:
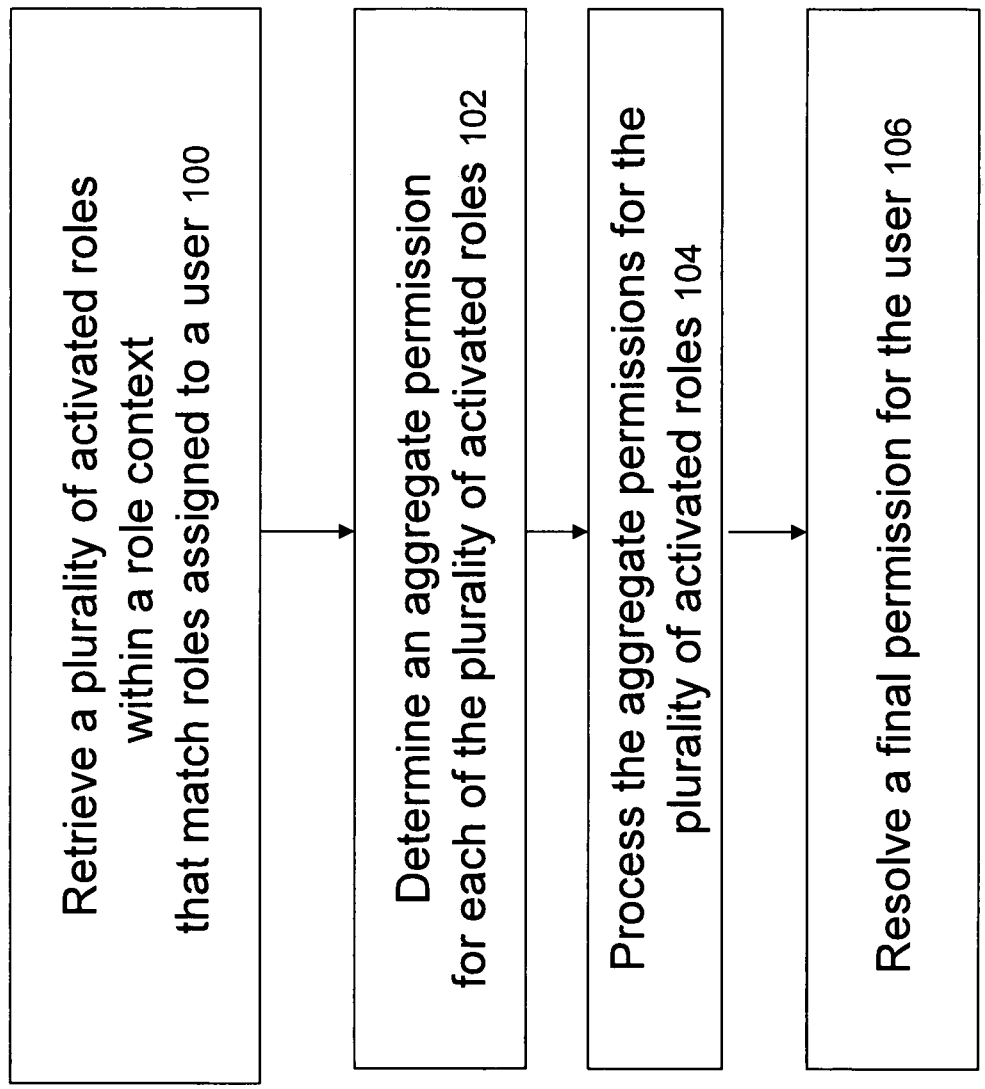
FIG. 1 is an flowchart that shows a method for resolving permissions in accordance with an embodiment.

The detailed description uses the following definitions:

Definitions

Operation—An action within the system for which a user must possess a specific set of permissions to perform.

Role—An identifier of function and responsibility within the system. Access to various contexts within the system may require the possession of or lack of a set of roles. Zero or more roles2 may be assigned to a user.

Role Activation—Enabling access of a role to a role context is known as activating a role within the context. When activating a role in a context, the administrator must also choose the role activation operator that affects how the activated role is interpreted.

The role activation operators defined include:

NOT—The user must not possess the activated role.

EQ—The user must possess exactly the activated role.

LEQ—The user must possess a role that is equal to, or is a parent role to the activated role in the role hierarchy.

GEQ—The user must possess a role that is equal to, or is derived from the activated role in the role hierarchy.

Once a role is activated within a context, any user possessing the role (within the restrictions of the role activation operator) may access the role context within the limitations of the permissions defined for the activated role within the role context. For example, if a role Developer has been activated in the Java Components role context with an role activation operator of EQ, any user possessing the Developer role may access the Java Components role context. That user's access to the context will be governed by the permissions defined for Developers in the role context. When a role is activated within a role context, all permission classes defined in the role context must be instantiated for the activated role. Some embodiments include only the first two operators (NOT and EQ); other embodiments include more operators.

Permission Class—A permission class is a permission template. A permission class must minimally define a unique class name. Other permission class attributes may also be defined, such as cardinality, valid time range, default status, etc.

Permission Instance—A permission instance is a concrete realization of a permission class (also known as permission). Permissions are associated with activated roles within a role context. A permission instance must contain a valid value for the status attribute.

Role Context—Generally, a role context is a set of system functionality for which one or more permission are required. More specifically, a role context is a set of permission classes and activated roles. All of the permission classes defined within the context must be instantiated for each role that is activated within the context.

Role Context Permission Inheritance Hierarchy—Permissions in one role context inherit values from permissions in a parent context. Inheritance only occurs if a role context, $RC_{child}$, is a child of another role context, $RC_{parent}$. If a permission class, $PC_{child}$, is contained in $RC_{child}$, and a permission class of an identical name, $PC_{parent}$, is also contained in $RC_{parent}$, and a role R is activated in $RC_{child}$, for which a role of the same type (or a super-type) is also activated in $RC_{parent}$, and the permission, $P_{child}$, has a value of inherit, then $P_{child}$ shall have the value of the permission associated with R, $RC_{parent}$, and $PC_{parent}$.

The inheritance hierarchy requires that all permission classes defined in $RC_{parent}$ are also defined in $RC_{child}$. In some embodiments, the roles that get propagated from $RC_{parent}$ to $RC_{child}$ are selectable by the user. In other embodiments, all roles activated in $RC_{parent}$ would also be activated in $RC_{child}$.

Role Inheritance Hierarchy—Defining a relationship between roles that corresponds to an organizational structure. The inheritance relationship is an "is a" relationship. For an example of an "is a" relationship, a java developer is a developer, but not all developers are java developers. The inheritance relationship is used in evaluating role context permission inheritance hierarchy.

Role Propagation—The inclusion of activated roles existing in a parent role context in a child role context.

Permission class attributes and permission attributes are used in one embodiment:

Permission Class Attributes
 Class Name: Name of the Permission Class.
 Some embodiments include additional attributes, including: Valid Time Range, Default Status, and Cardinality.

Permission Attributes
 Status: Inherit|Grant|Deny|Override Deny
 Inherit (default): value for this permission is to be determined using a permission inheritance algorithm.
 Grant: the permission is granted.
 Deny: the permission is denied. Due to the rule of least restrictive access, if the permission is granted to a held role elsewhere in the permission inheritance hierarchy, the deny permission will be overridden. In this sense, deny is the "weakest" permission.
 Override Deny: the permission is denied, regardless of whether it is granted in any other held role within the same context, or elsewhere in the permission inheritance hierarchy.
 Least Restrictive Access—Grant takes precedence over deny in permission attribute status settings. If any role that a user holds grants access to a particular permission class within a given context, then the user will be granted access to that permission class within that context. The only exception to this rule is if the user holds a role within a role context that contains a status of override deny for a given permission class. In such a case, denial of permission is guaranteed, regardless of the value of the same permission class in other roles held by the user.

The traditional implementation of role based access control (RBAC) does not allow administrators to quickly make security changes to large portions of the system. Furthermore, the traditional implementation of RBAC does not have the ability to restrict users that should not be granted access when the user possesses a role that would normally be granted access. Accordingly, there is a need for a solution that would enable administrators to quickly make security changes and enable administrators to restrict users that should not be granted access when the user possesses a role that would normally be granted access.

Security systems relying on RBAC assign role contexts to users to permit or deny access to a resource based on the roles that a user has. In order to enable administrators to quickly make security changes in a system using RBAC, an embodiment has role contexts organized in a role context inheritance hierarchy. Changes in a top-level security context automatically propagate to child contexts, permitting dynamic configuration of RBAC. Role activation operators enable an administrator to control how changes propagate up and down the inheritance hierarchy.

Role activation operators also enable an administrator to restrict access to users that should not be granted access even though they possess a role that would normally be granted access. One example of the situation would be when a software developer would normally have access to software development assets, but a foreign national software developer is prohibited from viewing national security software assets. In that scenario, Role activation operators would deny access to the foreign national even though other software developers are granted access to the software development assets.

In one embodiment, role activation operators are used by a security module for a metadata repository. A metadata repository provides the tools to manage the metadata for any type of software asset, from business processes and Web services to patterns, frameworks, applications, and components. A metadata repository maps the relationships and interdependencies that connect those software assets to improve impact analysis, promote and optimize reuse, and measure the bottom line value. A metadata repository provides visibility into and traceability of the entire enterprise software asset portfolio. A metadata repository is designed to let organizations govern the software asset lifecycle to ensure alignment with architecture. In one embodiment, the metadata repository provides information about services, design-time and/or run-time. In one embodiment, the metadata repository can provide location information pointing to design-time artifacts that exist outside the metadata repository (e.g. design-time artifacts stored in a source code management system). In one embodiment, the metadata repository provides location information pointing to a runtime instance of the service.

FIG. 1 is a flowchart that shows a method for resolving permissions in accordance with an embodiment. In step 100, the system is retrieving a plurality of activated roles within a role context that match roles assigned to a user. In step 102, the system is determining an aggregate permission for each of the plurality of activated roles. In step 104, the system is process the aggregate permissions for the plurality of activated roles. In step 106, the system resolves a final permission for the user. In one embodiment, the system is a security module for a metadata repository.

Figure 2:
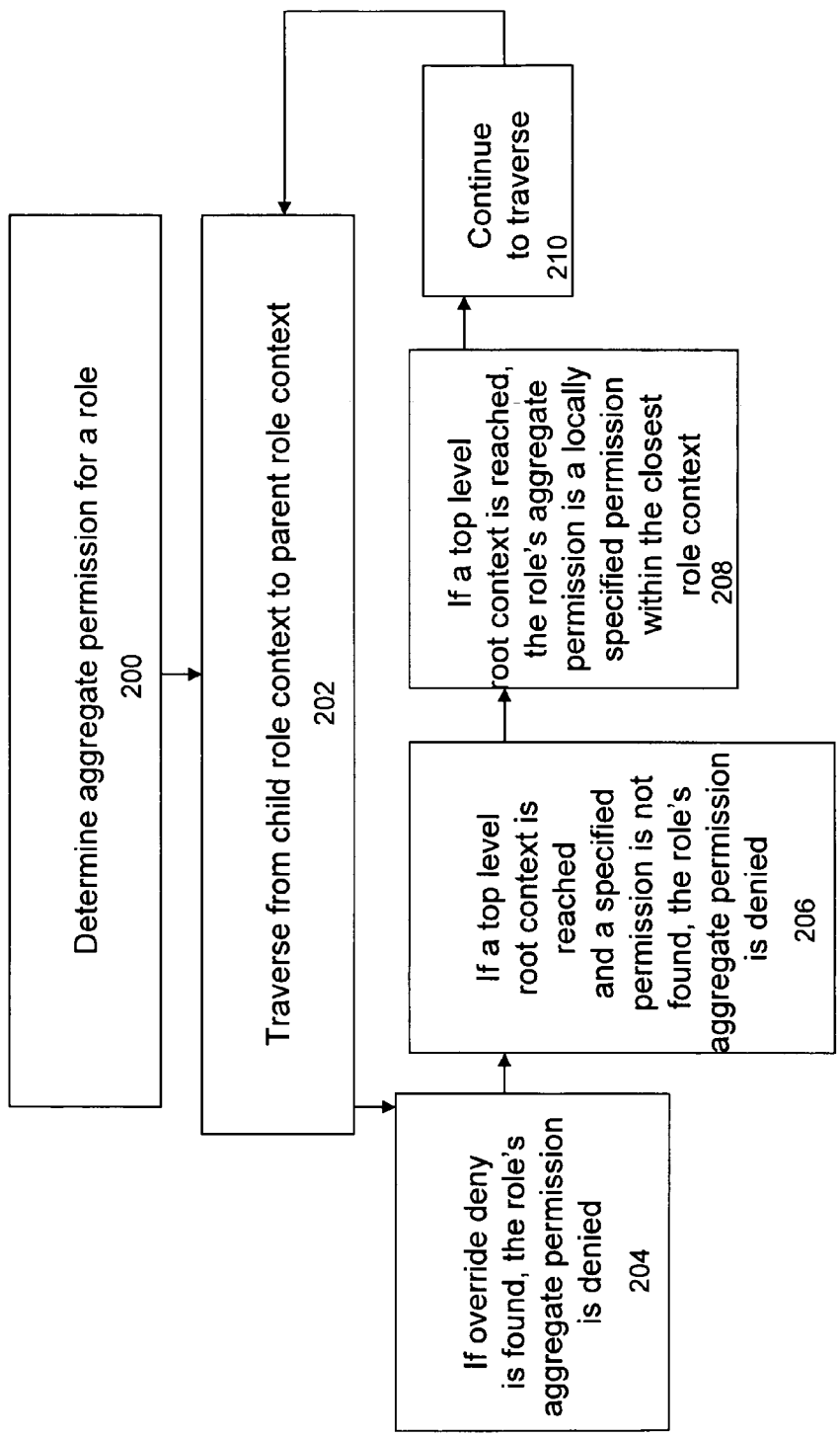
FIG. 2 is a flowchart that shows determining an aggregate permission for a role in accordance with an embodiment.

FIG. 2 is a flowchart that shows determining an aggregate permission for a role in accordance with an embodiment. In step 200, the system determines each activated role's aggregate permission. In step 202, the system traverses from a child role context to a parent role context. In step 204, if the system found override deny while traversing, the role's aggregate permission is denied. In step 206, if the system reaches a top level root context and a specified permission is not found, the role's aggregate permission is not found. In step 208, if a top level root context is reached, the role's aggregate permission is a locally specified permission within a closest role context. In step 210, the system continues to traverse from a child role context to a parent role context. In one embodiment, the system is a security module for a metadata repository.

Figure 3:
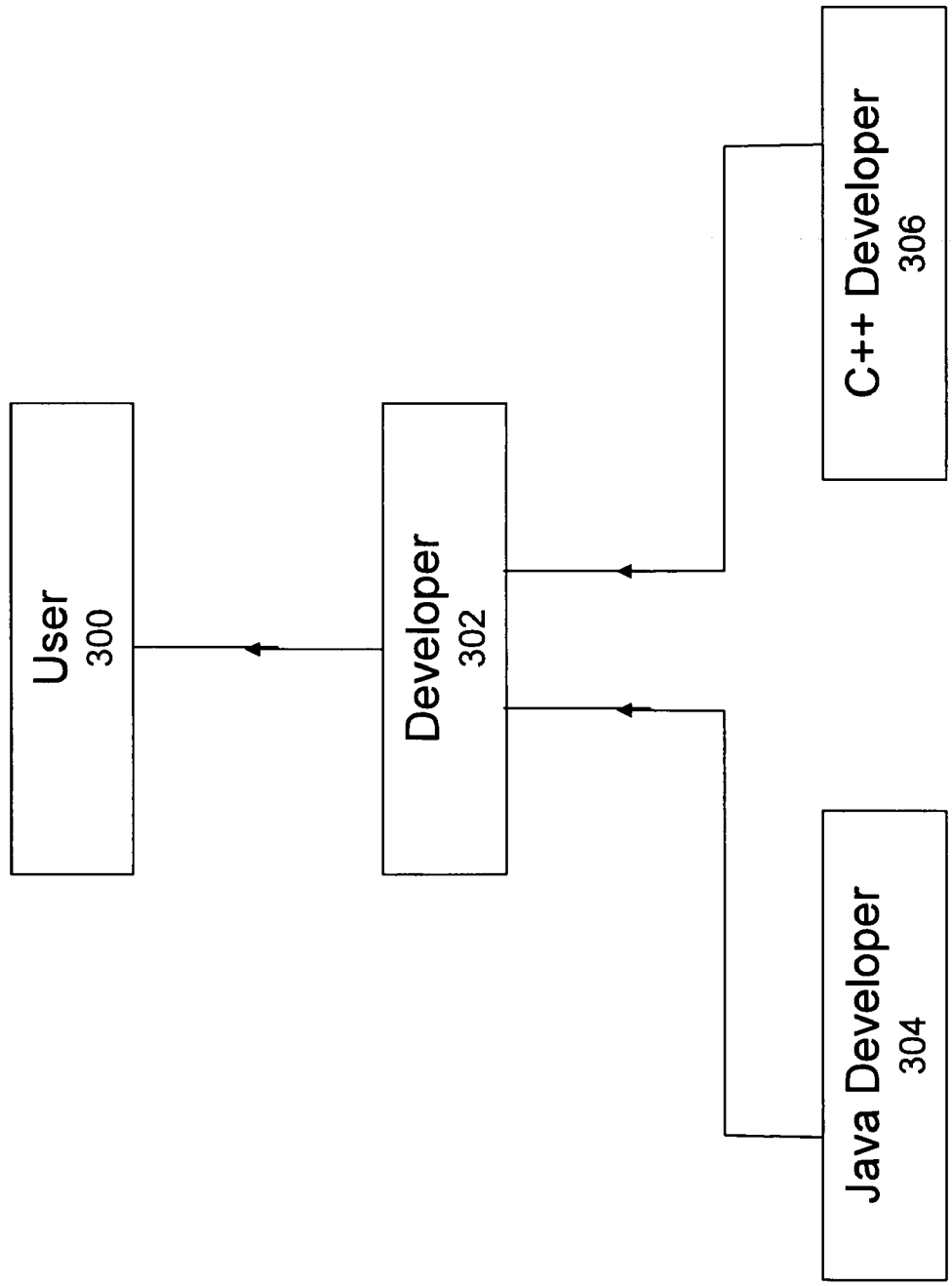
FIG. 3 is an illustration that shows an example of a role inheritance hierarchy in accordance with an embodiment.

FIG. 3 is an illustration that shows an example of a role inheritance hierarchy in accordance with an embodiment. A User 300 is the most general role. The arrow between User 300 and Developer 302 shows that all Developers are Users, but not all Users are Developers. The arrow between Developer 302 and Java Developer 304 shows that all Java Developers are Developers, but not all Developers are Java Developers. The arrow between Developer 302 and C++ Developer 306 shows that all C++ Developers are Developers, but not all Developers are C++ Developers. If the EQ role activation operator is applied to a Developer, then only a Developer (not a Java Developer or a C++ Developer) would meet the requirement. If the NOT role activation operator is applied to a Developer, then a user with the developer role would not meet the requirement. If the GEQ role activation operator is applied to a role of Developer 302, then either a Developer 302, a Java Developer 304, or a C++ Developer 306 would meet the requirement. If the LEQ role activation operator is applied to a role of Developer 304, then either a Developer 302 or a User 300 would meet the requirement. Roles within an organization are often related in a hierarchical manner with respect to responsibility. Role inheritance is used to model this hierarchy with regards to permissions to access resources.

FIG. 4 is a table that shows an example of a role context in accordance with an embodiment. The roles 404 in this example are Default User 402 and Registrar 420. The Registrar typically has additional responsibilities for the assets beyond the responsibilities of a default user. The Default User 402 role and the Registrar 420 role have a status of Grant 410 and 418 to View 406 an asset. To Edit 412 an asset, however, the registrar 420 has Grant 416 as the status, but the Default User 402 only has Inherit 414 as the status. The default user does not have permission to edit an asset, unless that permission is inherited from another role.

FIG. 5 is a table that shows an example of a role context in accordance with an embodiment. A role context called Java Components 500 is defined. Four permission classes—Read 506, Write 510, Delete 514, and Extract 518—are defined in the Java Components role context 500. The Developer 520 and Guest 524 roles have been activated in the role context, and permissions have been defined for the four permission classes. The Developer 520 has a role activation operator of EQ 522, Read 506 status is set to Grant 504, Write 510 status is set to Grant 508, Delete 514 status is set to Inherit 512, and Extract 518 status is set to Grant 516. The Guest 524 has an role activation operator of EQ 526, Read 506 status is set to Grant 528, Write 510 status is set to Grant 530, Delete 514 status is set to Inherit 532, and Extract 518 status is set to Grant 534.

Figure 6:
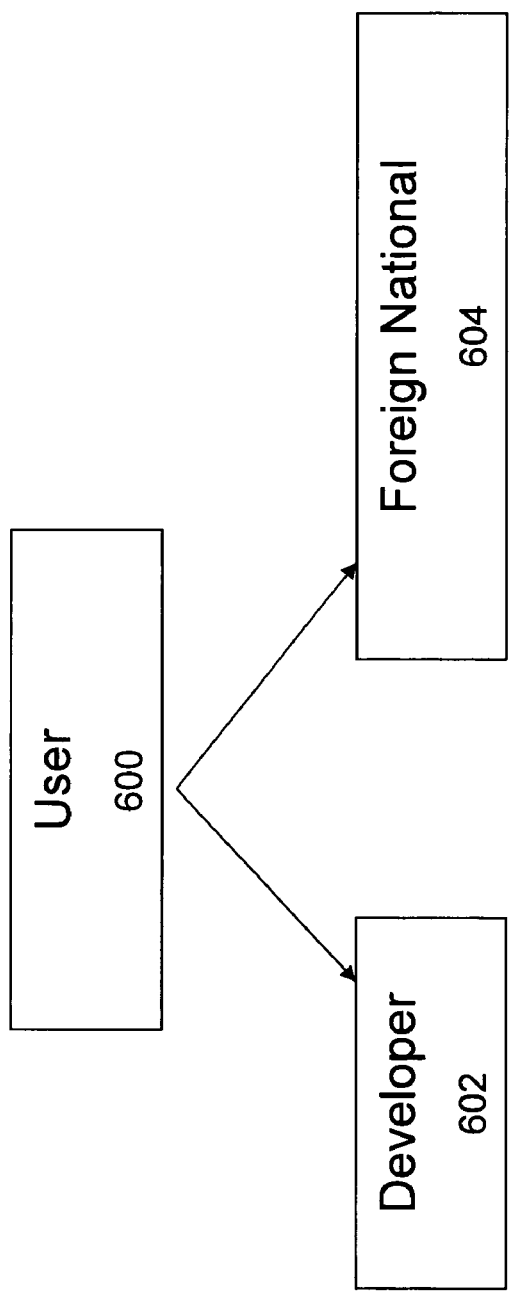
FIG. 6 is an illustration that shows an example of a user with two roles, Developer and Foreign National in accordance with an embodiment.

In FIGS. 6 and 7, an example scenario representing least restrictive access and overriding denies is depicted. FIG. 6 is an illustration that shows an example of a user with two roles, Developer and Foreign National in accordance with an embodiment. FIG. 7 is a table that shows an example of least restrictive access in accordance with an embodiment. A user 600 has two roles: Developer 602 and Foreign National 604. The Java Components role context 710 is shown in which three permission classes are defined: Browse 716, Extract 720, and Delete 724. Two roles have been activated in the role context: Foreign National 706 and Developer 708. The user has been granted both of these roles. For the permission class Browse 716, the aggregate permission is Granted 732 to the user. This is because the Grant 734 permission value from the Developer role takes precedence over the Deny 718 permission from the Foreign National role. In the case of the Extract 720 permission class, the aggregate permission result is Denied 736, because Override Deny 722 takes precedence over Grant 738. In the case of the Delete 724 permission class, the aggregate permission result is Denied 740, because Override Deny 726 takes precedence over Grant 742.

In one embodiment, a role activation operator is assigned to a role. A user can have several roles, and each role can have a different role activation operator. In one embodiment, the role activation operator can be the EQ operator, which requires that a user possess the activated role. In one embodiment, the role activation operator can be the NOT operator, which requires that a user not possess the activated role. In one embodiment, the role activation operator can be the LEQ operator, which requires that a user possess a role that is equal to, or is a parent role to the activated role in a role hierarchy. In one embodiment, the role activation operator can be the GEQ operator, which requires that a user possess a role that is equal to, or is derived from the activated role in the role inheritance hierarchy.

Individuals within an organization often perform more than one function and frequently have more than a single set of responsibilities. When configuring access to a software system, it is convenient to be able to group and categorize functions that are related to interacting with the system in a specific way. Furthermore, it is ideal to be able to easily assign access to users.

A role acts as an identifier of function and responsibility within the system. Roles can be assigned to users. When a role is assigned to a user, the user is granted access to the functionality within the system that requires that role. Users can be assigned multiple roles. For example, a user might be acting as both a developer and a testing engineer.

Roles and Role Contexts

In order to be mapped to specific system functionality, a role must be interpreted within a role context. A role context identifies system functionality that requires privileged access. For example, accessing Java components would likely be privileged functionality. A role context called Java Components can be created to model the system functionality related to accessing Java components.

The specific operations that can be performed on Java components can be further broken down within the Java Components role context using permission classes. Generally, each permission class is directly related to some operation within the system. For example, a permission class called Browse might be created and added to the Java Components role context that would control the ability for users to browse Java components.

Allowing a role to access a particular role context is known as activating a role within a context. For example, to allow the Developer role to access the Java Components role context, the security administrator would activate that role in the context. The result would be that any user that had been granted the Developer role would be able to access the Java Components role context, within the constraints of the permissions specified for the Developer role.

In FIG. 8, an example definition of the Java Components role context 800 is illustrated. Four privilege classes have been defined: Browse 802, Create 804, Delete 806, and Extract 808. The Developer role 810 has been activated in the context. When a role is activated within a context, a permission must be defined for each permission class. See above for definition of valid permission attributes. In this example, any user who is only assigned the Developer role will be able to browse 804 and extract 810 Java components because each of those permission classes has the status of Grant 816 and 822, but the user will not be able to create 806 or delete 808 them because the user has the status of Deny 818 and 820. The developer role has a role activation operator 802 set to GEQ 814, which requires that a user who possess a role that is equal to, or is derived from the Developer role in the role inheritance hierarchy, will have access to these permission classes.

An embodiment of a process for resolving permissions is presented below:

1. Retrieve all activated roles within the role context.
2. Retrieve all roles assigned to the user.
3. If user does not have at least one role matching one of the activated roles, then access to the role context is implicitly denied.
4. For each role assigned to the user and activated within the role context, determine its aggregate permission set (in accordance with Role Context Permission Inheritance).
5. Traverse from child role context to parent role context until a definitive permission is determined (override deny) or until the top level root context has been reached.
6. In embodiments that do not implement role based inheritance, traversal from child role context to parent role context means evaluating identically named roles (Developer→Developer). In embodiments that do implement role based inheritance, traversal may mean evaluating roles based on a role hierarchy before a role context switch (Java Developer, Developer→Java Developer, Developer).
7. Encountering an override deny along the traversal short circuits the evaluation and immediately implies that the role's aggregate permission at the desired role context is denied.
8. If an override deny is not encountered, then the role's aggregate permission shall be the most locally specified permission (within the closest role context).
9. If a specified permission is not encountered and the top level root context has been reached, the role's aggregate permission shall be "implicitly" denied.
10. Processing the aggregate roles of all user roles which are activated for the role context.
11. Determine the final aggregate permission.
12. Least restrictive access barring an override deny: (Grant) && (!Override Deny)→Grant Some example use cases that describe scenarios where role activation operators may be appropriate for the security module of a metadata repository are described below:

Use Cases

Distributed Registrars

Scenario: In this scenario, an administrator wants to divide assets into groups and have different groups of people responsible for each group of assets. These groups of assets may or may not align with asset types.

Solution: The administrator creates several different category-specific registrars. If the authority is split based solely on asset type, the administrator assigns the authority to the specific role at the asset type level. If the authority is based on a security setting instead, the administrator assigns the authority based on the security setting.

Preview Assets

Scenario: In this scenario, the administrator wants to have "Development" assets that are only visible to a select group of users. This allows the assets to be previewed and reviewed before they are available to the entire organization.

Solution: The administrator creates a "Development" role and a "Development Only" security setting. Only users with the "Development" role are allowed to access assets with the "Development Only" security setting. The "Development Only" security setting is assigned to all assets that should be restricted Export-Controlled Scenario: In this scenario, the administrator wants to have export-controlled assets that are hidden from foreign nationals. This allows both export-controlled assets and non-export controlled assets to exist in the same system while supporting compliance with government export control restrictions while providing access to non-export controlled assets to both U.S. nationals and foreign nationals.

Solution: The administrator creates a "Foreign National" role and an "Export Controlled" security setting. Users with the "Foreign National" role are unable to view assets with the "Export Controlled" security setting.

Only Advanced Submitters

Scenario: The administrator wants to have advanced submitters submit all assets. All other users should not be able to submit assets.

Solution: The administrator removes the submit permission from the default user permissions. The administrator grants the submit permission to advanced submitters.

Unapproved Users Browsing Assets

Scenario: The administrator wants to allow unapproved users to browse Assets in a restricted manner. Unapproved users can view the Asset Overview (and optionally several other panels), but are not permitted to extract.

Solution: The administrator disables extract permission form the unapproved user permissions. The administrator sets access for other panels per Asset Type as desired.

Roles Already Defined Elsewhere

Scenario: The administrator wants to take advantage of roles that are already designated in another system.

Solution: The roles that are assigned to a user can optionally be loaded from LDAP. This would allow the roles to be dynamically updated as LDAP is updated. The roles must be defined, and must match the LDAP roles exactly.

Multi-Level Document Security

Scenario: The administrator wants to have multiple security levels for assets ranging from extremely secret to publicly available information. These security levels are hierarchical, so that users with the highest level of security can automatically see less secure assets.

Solution: The administrator creates one role and one security setting for each level of security. The administrator assigns the roles for all levels that the user can access to each user. The administrator assigns the security level security setting to the assets. The administrator configures each security setting to restrict users who do not have the corresponding role.

Embodiments can include computer-based methods and systems which may be implemented using a conventional general purpose computer(s) or a specialized digital computer(s) or microprocessor(s), programmed according to the teachings of the present disclosure. Appropriate software coding can readily be prepared by programmers based on the teachings of the present disclosure.

Embodiments can include a computer readable medium, such as a computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling the hardware of a computer, such as a general purpose/specialized computer(s) or a microprocessor(s), and for enabling them to interact with a human user or other mechanism utilizing the results of the present invention. Such software may include, but is not limited to, device drivers, operating systems, execution environments/containers, and user applications.

Embodiments can include providing code for implementing processes. The providing can include providing code to a user in any manner. For example, the providing can include transmitting digital signals containing the code to a user; providing the code on a physical media to a user; or any other method of making the code available.

Embodiments can include a computer-implemented method for transmitting the code which can be executed at a computer to perform any of the processes of embodiments. The transmitting can include transfer through any portion of a network, such as the Internet; through wires, the atmosphere or space; or any other type of transmission. The transmitting can include initiating a transmission of code; or causing the code to pass into any region or country from another region or country. A transmission to a user can include any transmission received by the user in any region or country, regardless of the location from which the transmission is sent.

The foregoing description of preferred embodiments has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A method for resolving permissions executed by a computer that includes one or more processors, said method comprising the steps of:
    a) retrieving a plurality of activated roles within a role context that match roles assigned to a user, wherein one or more permissions in the role context inherit from one or more permissions in a parent role context in a role context permission inheritance hierarchy;
    b) determining an aggregate permission for each of the plurality of activated roles, wherein a role activation operator determines how an activated role is evaluated;
    c) processing the aggregate permissions for the plurality of activated roles; and
    d) resolving a final permission for the user;
    wherein a permission class is defined in the role context and instantiated for an activated role; and
    wherein the permission class further comprises cardinality, valid time range, and default status.

2. The method of claim 1, wherein a permission instance contains a valid value for a status attribute.

3. The method of claim 1, wherein step b) comprises determining each activated role's aggregate permission for the user in accordance with role context permission inheritance, wherein the role activation operator determines how an activated role is interpreted.

4. The method of claim 1, wherein step b) requires traversing from child role context to parent role context until a definitive permission is determined or until the top level root context has been reached.

5. The method of claim 1, wherein role activation operators are used by a security module of a metadata repository to protect assets in the metadata repository.

6. The method of claim 1, wherein the role activation operator is at least one of:
    an equals operator that requires that a user possess the activated role;
    a not operator that requires that a user not possess the activated role;
    a less than or equals operator that requires that a user possess a role that is equal to, or is a parent role to the activated role in the hierarchy; and
    a greater than or equals operator that requires that a user possess a role that is equal to, or is derived from the activated role in the hierarchy.

7. The method of claim 1, wherein a change in a top-level role context in the role context permission inheritance hierarchy is automatically propagated to one or more child role contexts; and
    wherein the role activation operator controls how said change is propagated in the permission inheritance hierarchy.

8. A method for resolving permissions executed by a computer that includes one or more processors, said method comprising the steps of:
    a) retrieving a plurality of activated roles within a role context that match roles assigned to a user, wherein one or more permissions in the role context inherit from one or more permissions in a parent role context in a role context permission inheritance hierarchy;
    b) determining an aggregate permission for each of the plurality of activated roles, wherein a role activation operator determines how an activated role is evaluated;
    c) processing the aggregate permissions for the plurality of activated roles; and
    d) resolving a final permission for the user;
    wherein a grant of permission takes precedence over a denial of permission unless a user holds a role within a role context that contains a status of override deny for a permission class.

9. The method of claim 8, wherein the role activation operator is at least one of:
    an equals operator that requires that a user possess the activated role;
    a not operator that requires that a user not possess the activated role;

a less than or equals operator that requires that a user possess a role that is equal to, or is a parent role to the activated role in the hierarchy; and a greater than or equals operator that requires that a user possess a role that is equal to, or is derived from the activated role in the hierarchy.

10. The method of claim 8, wherein a change in a top-level role context in the role context permission inheritance hierarchy is automatically propagated to one or more child role contexts; and wherein the role activation operator controls how said change is propagated in the permission inheritance hierarchy.

11. A method for resolving permissions executed by a computer that includes one or more processors, said method comprising the steps of:
a) retrieving a plurality of activated roles within a role context that match roles assigned to a user, wherein one or more permissions in the role context inherit from one or more permissions in a parent role context in a role context permission inheritance hierarchy;
b) determining an aggregate permission for each of the plurality of activated roles, wherein a role activation operator determines how an activated role is evaluated;
c) processing the aggregate permissions for the plurality of activated roles; and
d) resolving a final permission for the user;
wherein, in step a), if a user does not have at least one role matching one of the activated roles, then access to the role context is implicitly denied.

12. The method of claim 11, wherein the role activation operator is at least one of:
an equals operator that requires that a user possess the activated role;
a not operator that requires that a user not possess the activated role;
a less than or equals operator that requires that a user possess a role that is equal to, or is a parent role to the activated role in the hierarchy; and
a greater than or equals operator that requires that a user possess a role that is equal to, or is derived from the activated role in the hierarchy.

13. The method of claim 11, wherein a change in a top-level role context in the role context permission inheritance hierarchy is automatically propagated to one or more child role contexts; and wherein the role activation operator controls how said change is propagated in the permission inheritance hierarchy.

14. A method for resolving permissions executed by a computer that includes one or more processors, said method comprising the steps of:
a) retrieving a plurality of activated roles within a role context that match roles assigned to a user, wherein one or more permissions in the role context inherit from one or more permissions in a parent role context in a role context permission inheritance hierarchy;
b) determining an aggregate permission for each of the plurality of activated roles, wherein a role activation operator determines how an activated role is evaluated;
c) processing the aggregate permissions for the plurality of activated roles; and
d) resolving a final permission for the user;
wherein step b) requires traversing from child role context to parent role context until a definitive permission is determined or until the tope level root context has been reached; and wherein a definitive permission is determined when override deny is found.

15. The method of claim 14, wherein a role's aggregate permission is a locally specified permission within a closest role context.

16. The method of claim 14, wherein the role activation operator is at least one of:
an equals operator that requires that a user possess the activated role;
a not operator that requires that a user not possess the activated role;
a less than or equals operator that requires that a user possess a role that is equal to, or is a parent role to the activated role in the hierarchy; and
a greater than or equals operator that requires that a user possess a role that is equal to, or is derived from the activated role in the hierarchy.

17. The method of claim 14, wherein a change in a top-level role context in the role context permission inheritance hierarchy is automatically propagated to one or more child role contexts; and wherein the role activation operator controls how said change is propagated in the permission inheritance hierarchy.

18. A method for resolving permissions executed by a computer that includes one or more processors, said method comprising the steps of:
a) retrieving a plurality of activated roles within a role context that match roles assigned to a user, wherein one or more permissions in the role context inherit from one or more permissions in a parent role context in a role context permission inheritance hierarchy;
b) determining an aggregate permission for each of the plurality of activated roles, wherein a role activation operator determines how an activated role is evaluated;
c) processing the aggregate permissions for the plurality of activated roles; and
d) resolving a final permission for the user;
wherein step b) requires traversing from child role context to parent role context until a definitive permission is determined or until the tope level root context has been reached; and
wherein if an override deny is found along the traversal, then the traversal ends and the role's aggregate permission for the role context is denied.

19. The method of claim 18, wherein the role activation operator is at least one of:
an equals operator that requires that a user possess the activated role;
a not operator that requires that a user not possess the activated role;
a less than or equals operator that requires that a user possess a role that is equal to, or is a parent role to the activated role in the hierarchy; and
a greater than or equals operator that requires that a user possess a role that is equal to, or is derived from the activated role in the hierarchy.

20. The method of claim 18, wherein a change in a top-level role context in the role context permission inheritance hierarchy is automatically propagated to one or more child role contexts; and wherein the role activation operator controls how said change is propagated in the permission inheritance hierarchy.

21. A method for resolving permissions executed by a computer that includes one or more processors, said method comprising the steps of:

a) retrieving a plurality of activated roles within a role context that match roles assigned to a user, wherein one or more permissions in the role context inherit from one or more permissions in a parent role context in a role context permission inheritance hierarchy;

b) determining an aggregate permission for each of the plurality of activated roles, wherein a role activation operator determines how an activated role is evaluated;

c) processing the aggregate permissions for the plurality of activated roles; and d) resolving a final permission for the user;

wherein step b) requires traversing from child role context to parent role context until a definitive permission is determined or until the tope level root context has been reached; and wherein if an override deny is not encountered, then the role's aggregate permission is a locally specified permission.

22. The method of claim 21, wherein the role activation operator is at least one of:

an equals operator that requires that a user possess the activated role;

a not operator that requires that a user not possess the activated role;

a less than or equals operator that requires that a user possess a role that is equal to, or is a parent role to the activated role in the hierarchy; and a greater than or equals operator that requires that a user possess a role that is equal to, or is derived from the activated role in the hierarchy.

23. The method of claim 21, wherein a change in a top-level role context in the role context permission inheritance hierarchy is automatically propagated to one or more child role contexts; and wherein the role activation operator controls how said change is propagated in the permission inheritance hierarchy.

24. A method for resolving permissions executed by a computer that includes one or more processors, said method comprising the steps of:

a) retrieving a plurality of activated roles within a role context that match roles assigned to a user, wherein one or more permissions in the role context inherit from one or more permissions in a parent role context in a role context permission inheritance hierarchy;

b) determining an aggregate permission for each of the plurality of activated roles, wherein a role activation operator determines how an activated role is evaluated;

c) processing the aggregate permissions for the plurality of activated roles; and d) resolving a final permission for the user;

wherein step b) requires traversing from child role context to parent role context until a definitive permission is determined or until the tope level root context has been reached; and wherein if a specified permission is not encountered and a top level root context has been reached, a role's aggregate permission is implicitly denied.

25. The method of claim 24, wherein the role activation operator is at least one of:

an equals operator that requires that a user possess the activated role;

a not operator that requires that a user not possess the activated role;

a less than or equals operator that requires that a user possess a role that is equal to, or is a parent role to the activated role in the hierarchy; and a greater than or equals operator that requires that a user possess a role that is equal to, or is derived from the activated role in the hierarchy.

26. The method of claim 24, wherein a change in a top-level role context in the role context permission inheritance hierarchy is automatically propagated to one or more child role contexts; and wherein the role activation operator controls how said change is propagated in the permission inheritance hierarchy.

* * * * *

UNITED STATES PATENT AND TRADEMARK OFFICE
CERTIFICATE OF CORRECTION

| | | |
|---|---|---|
| PATENT NO. | : 7,890,531 B2 | Page 1 of 1 |
| APPLICATION NO. | : 12/110136 | |
| DATED | : February 15, 2011 | |
| INVENTOR(S) | : Wallace et al. | |

It is certified that error appears in the above-identified patent and that said Letters Patent is hereby corrected as shown below:

In column 11, line 66, in Claim 14, delete "tope" and insert -- top --, therefor.

In column 12, line 41, in Claim 18, delete "tope" and insert -- top --, therefor.

In column 13, line 14, in Claim 21, delete "tope" and insert -- top --, therefor.

In column 14, line 14, in Claim 24, delete "tope" and insert -- top --, therefor.

Signed and Sealed this
Fourth Day of October, 2011

David J. Kappos
*Director of the United States Patent and Trademark Office*